US012425893B2

(12) United States Patent
Han et al.

(10) Patent No.: US 12,425,893 B2
(45) Date of Patent: Sep. 23, 2025

(54) MOBILITY MEASUREMENT METHOD, APPARATUS, AND COMMUNICATION DEVICE

(71) Applicant: HUAWEI TECHNOLOGIES CO., LTD., Shenzhen (CN)

(72) Inventors: Jing Han, Beijing (CN); Li Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 437 days.

(21) Appl. No.: 17/960,165

(22) Filed: Oct. 5, 2022

(65) Prior Publication Data

US 2023/0023237 A1 Jan. 26, 2023

Related U.S. Application Data

(63) Continuation of application No. PCT/CN2021/086244, filed on Apr. 9, 2021.

(30) Foreign Application Priority Data

Apr. 10, 2020 (CN) ......................... 202010279006.2

(51) Int. Cl.
*H04W 24/08* (2009.01)

(52) U.S. Cl.
CPC .................................. *H04W 24/08* (2013.01)

(58) Field of Classification Search
CPC .................................................... H04W 24/08
See application file for complete search history.

(56) References Cited

U.S. PATENT DOCUMENTS

2015/0327286 A1* 11/2015 Yiu ....................... H04W 72/27 370/328
2019/0253906 A1 8/2019 Lin
(Continued)

FOREIGN PATENT DOCUMENTS

CN 109644076 A 4/2019
CN 110392991 A 10/2019
(Continued)

OTHER PUBLICATIONS

International Search Report issued in corresponding International Application No. PCT/CN2021/086244, mailed Jun. 29, 2021, pp. 1-9.
(Continued)

*Primary Examiner* — Michael Thier
*Assistant Examiner* — Tracy Lauren Raimondo
(74) *Attorney, Agent, or Firm* — HAUPTMAN HAM, LLP

(57) ABSTRACT

Embodiments of this application disclose a mobility measurement method, an apparatus, and a communication device, and relate to the field of communication technologies, to determine a scaling factor in CSI-RS based mobility measurement, and implement the CSI-RS based mobility measurement. A specific solution is: receiving a first configuration message, where the first configuration message is used to configure a first MO, and the first MO includes one or more CSI-RS resources; and determining a scaling factor of the first MO depending on whether there is a CSI-RS resource in the first MO that completely coincides with a gap, to perform mobility measurement on the first MO.

17 Claims, 8 Drawing Sheets

(56) References Cited

U.S. PATENT DOCUMENTS

| | | | | |
|---|---|---|---|---|
| 2019/0306734 | A1* | 10/2019 | Huang | H04W 24/08 |
| 2020/0107337 | A1 | 4/2020 | Lin | |
| 2022/0312234 | A1* | 9/2022 | Cui | H04W 24/08 |

FOREIGN PATENT DOCUMENTS

| | | | |
|---|---|---|---|
| WO | 2020034193 | A1 | 2/2020 |
| WO | 2020068472 | A1 | 4/2020 |

OTHER PUBLICATIONS

3GPP TS 38.133 V15.9.0 (Mar. 2020), 3rd Generation Partnership Project; Technical Specification Group Radio Access Network; NR; Requirements for support of radio resource management(Release 15), 178 pages.
MediaTek Inc., Definition of Intra and inter frequency for CSI-RS RRM. 3GPP TSG-RAN WG4 Meeting #93, Reno, USA, Nov. 18-22, 2019, R4-1913589, 8 pages.
Extended European Search Report issued in corresponding European Application No. 21784902.5, dated Jul. 21, 2023, pp. 1-18.
3GPP TSG-RAN WG4 Meeting #93 R4-1913589, "Definition of Intra and inter frequency for CSI-RS RRM", MediaTek Inc.Reno, USA, Nov. 18-22, 2019, total 9 pages.
Chinese Office Action issued in corresponding Chinese Application No. 202010279006.2, dated Jul. 7, 2024, pp. 1-8.

* cited by examiner

CSI-RS resource

MOBILITY MEASUREMENT METHOD, APPARATUS, AND COMMUNICATION DEVICE

CROSS-REFERENCE TO RELATED APPLICATIONS

This application is a continuation of International Application No. PCT/CN2021/086244, filed on Apr. 9, 2021, which claims priority to Chinese Patent Application No. 202010279006.2, filed on Apr. 10, 2020. The disclosures of the aforementioned applications are hereby incorporated by reference in their entireties.

TECHNICAL FIELD

Embodiments of this application relate to the field of communication technologies, and in particular, to a mobility measurement method, an apparatus, and a communication device.

BACKGROUND

When a terminal performs communication, a position of the terminal usually changes. As the terminal moves, quality of communication between the terminal and a network device (for example, a base station) also changes correspondingly. Therefore, a requirement for terminal mobility measurement emerges. For example, the terminal may perform mobility measurement on one or more measurement objects (MOs) configured by the network device, and send an obtained measurement result to the network device, so that the network device determines a current communication status of the terminal and a measurement result of a neighboring cell, and performs mobility management on the UE.

For example, the mobility measurement may be implemented based on a channel state information reference signal (CSI-RS). For example, the terminal may receive an MO from the network device, where the MO includes one or more CSI-RS resources. Under instructions of the network device, the terminal may perform mobility measurement on the CSI-RS resource included in the MO, to obtain a measurement result corresponding to the MO.

It should be noted that when configuring a terminal to perform mobility measurement, the network device usually simultaneously configures a plurality of MOs for the terminal to perform mobility measurement. However, because a measurement capability of the terminal is limited, measurement on the plurality of MOs may not be completed simultaneously. Therefore, when performing measurement, the terminal first needs to determine a corresponding mobility measurement requirement.

SUMMARY

This application provides a mobility measurement method, an apparatus, and a communication device, and provides a CSI-RS based mobility measurement solution.

According to a first aspect, a mobility measurement method is provided. The method includes: receiving a first configuration message, where the first configuration message is used to configure a first measurement object (MO), and the first MO includes one or more channel state information reference signal (CSI-RS) resources; and determining a scaling factor of the first MO depending on whether there is a CSI-RS resource in the first MO that completely coincides with a measurement gap, to perform mobility measurement on the first MO.

Based on this solution, the terminal may determine, depending on whether the first MO indicated by the network device includes a CSI-RS resource that completely coincides with the gap, whether the first MO needs to contend for the gap for measurement, and further determine the scaling factor of the first MO. For example, when the first MO includes a CSI-RS resource that completely coincides with the gap, the first MO needs to contend for the gap for measurement. For another example, when the first MO does not include a CSI-RS resource that completely coincides with the gap, the first MO does not need to contend for the gap for measurement, that is, measurement may be performed outside the gap. The first configuration message may be configured by the network device for the terminal, and indicates the network device to perform CSI-RS based mobility measurement. Because configuration flexibility of the CSI-RS resource is high, a person skilled in the art cannot determine, without creative efforts, a scaling factor of a first MO including the CSI-RS resource with reference to a current technology (for example, SSB-based mobility measurement). However, this solution provides such a solution, so that the terminal can clearly determine the scaling factor in CSI-RS based mobility measurement, thereby ensuring smooth CSI-RS based mobility measurement.

With reference to the first aspect, in a possible implementation, the determining a scaling factor of the first MO depending on whether there is a CSI-RS resource in the first MO that completely coincides with a measurement gap includes: when there is at least one CSI-RS resource in the first MO that completely coincides with the gap, determining a carrier-specific scaling factor within the gap ($CSSF_{withingap}$) of the first MO based on the first MO and an MO that needs to contend for the gap, and determining the $CSSF_{withingap}$ as the scaling factor of the first MO; or when there is no CSI-RS resource in the first MO that completely coincides with the gap, determining a carrier-specific scaling factor outside the gap ($CSSF_{outsidegap}$) of the first MO based on the first MO and an MO measured outside the gap, and determining the scaling factor of the first MO based on the $CSSF_{outsidegap}$.

Based on this solution, methods for determining the scaling factor of the first MO in different cases (for example, a case in which there is a CSI-RS resource in the first MO that completely coincides with the measurement gap, and a case in which there is no CSI-RS resource in the first MO that completely coincides with the measurement gap) are provided. For example, when there is a CSI-RS resource in the first MO that completely coincides with the measurement gap, that is, when the first MO needs to contend for the gap for measurement, the terminal may determine a $CSSF_{withingap}$ of the first MO based on all MOs that need to contend for the gap, and use the $CSSF_{withingap}$ as the scaling factor of the first MO. When there is no CSI-RS resource in the first MO that completely coincides with the measurement gap, that is, when the first MO is measured outside the gap, the terminal may determine a $CSSF_{outsidegap}$ of the first MO based on all MOs measured outside the gap, and determine the scaling factor of the first MO based on the $CSSF_{outsidegap}$ For example, the terminal may use the $CSSF_{outsidegap}$ as the scaling factor of the first MO, or the terminal may determine the scaling factor after adjusting the $CSSF_{outsidegap}$ based on a searcher capability of the terminal.

With reference to the first aspect, in a possible implementation, the MO that needs to contend for the gap includes a second MO and/or a third MO. The second MO includes a CSI-RS resource that coincides with the gap. The third MO includes a synchronization signal block SSB resource that coincides with the gap, where the SSB resource is an SSB for mobility measurement configured by a network device, and/or the SSB resource is an associatedSSB carried in the first MO.

Based on this solution, it is specified that the MOs that contend for the gap may include a plurality of forms. For example, in some embodiments, if another MO (for example, a second MO) that is different from the first MO and that includes a CSI-RS resource also needs to contend for the gap for measurement, the terminal may use the second MO as the MO that contends for the gap to calculate the $CSSF_{withingap}$ of the first MO. In some other embodiments, if another MO (for example, a third MO) that includes an SSB resource also needs to contend for the gap for measurement, the terminal may use the third MO as the MO that contends for the gap to calculate the $CSSF_{withingap}$ of the first MO. In other words, in this embodiment, the terminal may consider both the MO including the SSB resource and the MO including the CSI-RS resource to contend for the gap. It should be noted that, in some scenarios, the terminal may separately provide different hardware and/or software configurations for the MO including the SSB resource and the MO including the CSI-RS resource for measurement, to achieve independent measurement of the MO including the SSB resource and the MO including the CSI-RS resource. Therefore, in some other embodiments of this solution, if another MO (for example, a third MO) including an SSB resource also needs to contend for the gap to perform measurement, the terminal may not consider the third MO when calculating a $CSSF_{withingap}$ of the first MO, but only consider another MO (for example, a second MO) that needs to contend for the gap and that includes a CSI-RS resource. It should be noted that, in this example, a CSI-RS resource that is in the second MO and that coincides with the gap may completely coincide with the gap, or may partially coincide with the gap. Similarly, an SSB resource that is in the third MO and that coincides with the gap may completely coincide with the gap, or may partially coincide with the gap. In addition, when an SSB for mobility measurement configured by the network device is the same as an SSB indicated by the associatedSSB carried in the first MO, the terminal may perform mobility measurement on the SSB only once without repeating measurement.

With reference to the first aspect, in a possible implementation, the first configuration message is further used to configure the third MO. Alternatively, the first MO carries an associated SSB (associatedSSB) identifier, and the associatedSSB identifier indicates to perform mobility measurement on the third MO. Based on this solution, a measurement indication of the third MO including the SSB resource may be configured for the terminal by using the first configuration message, or may be transferred to the terminal by adding the associatedSSB identifier to the first MO.

With reference to the first aspect, in a possible implementation, the method further includes: receiving a second configuration message, where the second configuration message is used to configure the third MO. Based on this solution, a measurement indication of the third MO including the SSB resource may also be delivered to the terminal by using a configuration message (for example, the second configuration message) different from the first configuration message.

With reference to the first aspect, in a possible implementation, the MO measured outside the gap includes a fourth MO and/or a fifth MO. There is no CSI-RS resource in the fourth MO that completely coincides with the gap. There is no SSB resource in the fifth MO that completely coincides with the gap.

Based on this solution, it is specified that the MOs measured outside the gap may include a plurality of forms. For example, in some embodiments, if another MO (for example, a fourth MO) that is different from the first MO and that includes a CSI-RS resource is measured outside the gap, the terminal may use the fourth MO as an MO that contends for a measurement occasion outside the gap to calculate the $CSSF_{outsidegap}$ of the first MO. In some other embodiments, if another MO (for example, a fifth MO) that includes an SSB resource is measured outside the gap, the terminal may use the fifth MO as the MO measured outside the gap to calculate the $CSSF_{outsidegap}$ of the first MO. In other words, in this embodiment, the terminal may consider both the MO including the SSB resource and the MO including the CSI-RS resource to contend for a measurement occasion outside the gap. It should be noted that, in some scenarios, the terminal may separately provide different hardware and/or software configurations for the MO including the SSB resource and the MO including the CSI-RS resource for measurement, to achieve independent measurement of the MO including the SSB resource and the MO including the CSI-RS resource. Therefore, in some other embodiments of this solution, if another MO (for example, a fifth MO) including an SSB resource also needs to contend for the measurement occasion outside the gap, the terminal may not consider the fifth MO when calculating a $CSSF_{outsidegap}$ of the first MO, but only consider another MO (for example, a fourth MO) that needs to contend for the measurement occasion outside the gap and that includes a CSI-RS resource.

With reference to the first aspect, in a possible implementation, the first configuration message is further used to configure the fifth MO. The first MO carries an associatedSSB identifier, and the associatedSSB identifier indicates to perform mobility measurement on the fifth MO. Based on this solution, a measurement indication of the fifth MO including the SSB resource may be configured for the terminal by using the first configuration message, or may be transferred to the terminal by adding the associatedSSB identifier to the first MO.

With reference to the first aspect, in a possible implementation, the method further includes: receiving a second configuration message, where the second configuration message is used to configure the fifth MO. Based on this solution, a measurement indication of the fifth MO including the SSB resource may also be delivered to the terminal by using a configuration message (for example, the second configuration message) different from the first configuration message.

With reference to the first aspect, in a possible implementation, a CSI-RS periodicity of the first MO is equal to a longest periodicity of CSI-RS resources included in the first MO; or a CSI-RS periodicity of the first MO is equal to a longest periodicity of CSI-RS resources that are included in the first MO and that completely coincide with the gap.

Based on this solution, when determining a mobility measurement requirement, the terminal further needs to determine a CSI-RS periodicity of each MO including a CSI-RS resource. Therefore, this solution specifies a method for determining the periodicity of the first MO. That is, when the first MO needs to contend for the gap for measurement, the CSI-RS periodicity of the first MO is equal to a largest periodicity of all CSI-RS resources that are included in the first MO and that completely coincide with the gap. When the first MO is measured outside the gap, the CSI-RS periodicity of the first MO is equal to a largest periodicity of all CSI-RS resources included in the first MO.

According to a second aspect, a mobility measurement method is provided. The method includes: receiving a first configuration message, where the first configuration message is used to configure a first measurement object (MO), and the first MO includes one or more channel state information reference signal (CSI-RS) resources; determining a carrier-specific scaling factor outside the gap ($CSSF_{outsidegap}$) of the first MO based on the first MO and an MO measured outside the measurement gap; and determining a scaling factor of the first MO based on the $CSSF_{outsidegap}$.

Based on this solution, when the network device does not configure gap-related information for the terminal, the terminal may consider that all mobility measurements that need to be currently performed are measurements outside the gap. Therefore, refer to the first aspect, the terminal may determine the scaling factor of the first MO based on the $CSSF_{outsidegap}$ of the first MO, so that the terminal performs CSI-RS based mobility measurement based on the scaling factor.

With reference to the second aspect, in a possible implementation, the MO measured outside the gap includes a second MO and/or a third MO. There is no CSI-RS resource in the second MO that completely coincides with the gap. There is no synchronization signal block (SSB) resource that is in the third MO and that completely coincides with the gap. The SSB resource is an SSB for mobility measurement configured by a network device, and/or the SSB resource is an associated SSB associatedSSB carried in the first MO.

Based on this solution, it is specified that the MOs measured outside the gap may include a plurality of forms. Refer to the first aspect. In some embodiments, if another MO (for example, a second MO) that is different from the first MO and that includes a CSI-RS resource is measured outside the gap, the terminal may use the second MO as an MO that contends for a measurement occasion outside the gap to calculate the $CSSF_{outsidegap}$ of the first MO. In some other embodiments, if another MO (for example, a third MO) that includes an SSB resource is measured outside the gap, the terminal may use the third MO as the MO measured outside the gap to calculate the $CSSF_{outsidegap}$ of the first MO. In other words, in this embodiment, the terminal may consider both the MO including the SSB resource and the MO including the CSI-RS resource to contend for a measurement occasion outside the gap. It should be noted that, in some scenarios, the terminal may separately provide different hardware and/or software configurations for the MO including the SSB resource and the MO including the CSI-RS resource for measurement, to achieve independent measurement of the MO including the SSB resource and the MO including the CSI-RS resource. Therefore, in some other embodiments of this solution, if another MO (for example, a third MO) including an SSB resource also needs to contend for the measurement occasion outside the gap, the terminal may not consider the third MO when calculating a $CSSF_{outsidegap}$ of the first MO, but only consider another MO (for example, a second MO) that needs to contend for the measurement occasion outside the gap and that includes a CSI-RS resource.

With reference to the second aspect, in a possible implementation, the first configuration message is further used to configure the third MO. Alternatively, the first MO carries an associated SSB associatedSSB identifier, and the associatedSSB identifier indicates to perform mobility measurement on the third MO. Based on this solution, a measurement indication of the third MO including the SSB resource may be configured for the terminal by using the first configuration message, or may be transferred to the terminal by adding the associatedSSB identifier to the first MO.

With reference to the second aspect, in a possible implementation, the method further includes: receiving a second configuration message, where the second configuration message is used to configure the third MO. Based on this solution, a measurement indication of the third MO including the SSB resource may also be delivered to the terminal by using a configuration message (for example, the second configuration message) different from the first configuration message.

With reference to the second aspect, in a possible implementation, a CSI-RS periodicity of the first MO is equal to a longest periodicity of CSI-RS resources included in the first MO. Based on this solution, when determining a mobility measurement requirement, the terminal further needs to determine a CSI-RS periodicity of each MO including a CSI-RS resource. Therefore, this solution specifies a method for determining the periodicity of the first MO. That is, when the first MO is measured outside the gap, the CSI-RS periodicity of the first MO is equal to a largest periodicity of all CSI-RS resources included in the first MO.

According to a third aspect, a mobility measurement apparatus is provided. The apparatus includes a receiving unit and a determining unit. The receiving unit is configured to receive a first configuration message, where the first configuration message is used to configure a first measurement object (MO), and the first MO includes one or more channel state information reference signal (CSI-RS) resources. The determining unit is configured to determine a scaling factor of the first MO depending on whether there is a CSI-RS resource in the first MO that completely coincides with a measurement gap, to perform mobility measurement on the first MO.

With reference to the third aspect, in a possible implementation, the determining unit is configured to: when there is at least one CSI-RS resource in the first MO that completely coincides with the gap, determine a carrier-specific scaling factor within the gap ($CSSF_{withingap}$) of the first MO based on the first MO and an MO that needs to contend for the gap, and determine the $CSSF_{withingap}$ as a scaling factor of the first MO. The determining unit is further configured to: when there is no CSI-RS resource in the first MO that completely coincides with the gap, determine a carrier-specific scaling factor outside the gap ($CSSF_{outsidegap}$) of the first MO based on the first MO and an MO measured outside the gap, and determine the scaling factor of the first MO based on the $CSSF_{outsidegap}$.

With reference to the third aspect, in a possible implementation, the MO that needs to contend for the gap includes a second MO and/or a third MO. The second MO includes a CSI-RS resource that coincides with the gap. The third MO includes a synchronization signal block SSB resource that coincides with the gap, where the SSB resource is an SSB for mobility measurement configured by a network device, and/or the SSB resource is an associated SSB associatedSSB carried in the first MO.

With reference to the third aspect, in a possible implementation, the first configuration message is further used to configure the third MO. Alternatively, the first MO carries an associated SSB (associatedSSB) identifier, and the associatedSSB identifier indicates to perform mobility measurement on the third MO.

With reference to the third aspect, in a possible implementation, the receiving unit is further configured to receive a second configuration message, where the second configuration message is used to configure the third MO.

With reference to the third aspect, in a possible implementation, the MO measured outside the gap includes a fourth MO and/or a fifth MO. There is no CSI-RS resource in the fourth MO that completely coincides with the gap. There is no SSB resource in the fifth MO that completely coincides with the gap.

With reference to the third aspect, in a possible implementation, the first configuration message is further used to configure the fifth MO. The first MO carries an associatedSSB identifier, and the associatedSSB identifier indicates to perform mobility measurement on the fifth MO.

With reference to the third aspect, in a possible implementation, the receiving unit is further configured to receive a second configuration message, where the second configuration message is used to configure the fifth MO.

With reference to the third aspect, in a possible implementation, a CSI-RS periodicity of the first MO is equal to a longest periodicity of CSI-RS resources included in the first MO; or a CSI-RS periodicity of the first MO is equal to a longest periodicity of CSI-RS resources that are included in the first MO and that completely coincide with the gap.

According to a fourth aspect, a mobility measurement apparatus is provided. The apparatus includes a receiving unit and a determining unit. The receiving unit is configured to receive a first configuration message, where the first configuration message is used to configure a first measurement object (MO), and the first MO includes one or more channel state information reference signal (CSI-RS) resources. The determining unit is configured to: determine a carrier-specific scaling factor outside the gap ($CSSF_{outsidegap}$) of the first MO based on the first MO and an MO measured outside the measurement gap; and determine a scaling factor of the first MO based on the $CSSF_{outsidegap}$.

With reference to the fourth aspect, in a possible implementation, the MO measured outside the gap includes a second MO and/or a third MO. There is no CSI-RS resource in the second MO that completely coincides with the gap. There is no synchronization signal block (SSB) resource that is in the third MO and that completely coincides with the gap, where the SSB resource is an SSB for mobility measurement configured by a network device, and/or the SSB resource is an associated SSB associatedSSB carried in the first MO.

With reference to the fourth aspect, in a possible implementation, the first configuration message is further used to configure the third MO. Alternatively, the first MO carries an associated SSB (associatedSSB) identifier, and the associatedSSB identifier indicates to perform mobility measurement on the third MO.

With reference to the fourth aspect, in a possible implementation, the receiving unit is further configured to receive a second configuration message, where the second configuration message is used to configure the third MO.

With reference to the fourth aspect, in a possible implementation, a CSI-RS periodicity of the first MO is equal to a longest periodicity of CSI-RS resources included in the first MO.

According to a fifth aspect, a communication device is provided. The communication device includes one or more processors and one or more memories. The one or more memories are coupled to the one or more processors, and the one or more memories store computer instructions. When the one or more processors execute the computer instructions, the communication device is enabled to perform the mobility measurement method according to any one of the first aspect and the possible implementations of the first aspect, or perform the mobility measurement method according to any one of the second aspect and the possible implementations of the second aspect.

According to a sixth aspect, a chip system is provided, including a processing circuit and an interface. The processing circuit is configured to invoke, from a storage medium, and run a computer program stored in the storage medium, to perform the mobility measurement method according to any one of the first aspect and the possible implementations of the first aspect, or perform the mobility measurement method according to any one of the second aspect and the possible implementations of the second aspect.

According to a seventh aspect, a computer-readable storage medium is provided. The computer-readable storage medium includes computer instructions. When the computer instructions are run, the mobility measurement method according to any one of the first aspect and the possible implementations of the first aspect is performed, or the mobility measurement method according to any one of the second aspect and the possible implementations of the second aspect is performed.

According to an eighth aspect, a communication system is provided. The system includes the communication device provided in the fifth aspect and a network device. The network device may be configured to deliver a mobility measurement configuration to the communication device, so that the communication device can perform mobility measurement according to the mobility measurement method according to any one of the first aspect and the possible implementations of the first aspect, or the mobility measurement method according to any one of the second aspect and the possible implementations of the second aspect. For example, the network device may send a first configuration message to the communication device, where the first configuration message is used to configure a first MO, and the first MO includes one or more channel state information reference signal CSI-RS resources. The first MO may carry an associated SSB identifier, so that the terminal can determine an SSB-based mobility measurement indication based on the identifier. In some embodiments, the first configuration message may be further used to configure a third MO, and at least one synchronization signal block SSB resource in the third MO completely coincides with the gap. In some other embodiments, the first configuration message may be further used to configure a fifth MO, and there is no SSB resource in the fifth MO that completely coincides with the gap. In some other embodiments, the network device may be further configured to send a second configuration message to the terminal, where the second configuration message may be used to configure the third MO and/or the fifth MO. Certainly, the network device may further send another configuration message to the terminal, to indicate the terminal to perform mobility measurement on another MO that includes a CSI-RS resource.

It should be noted that any one of the third aspect to the eighth aspect and the possible designs of the third aspect to the eighth aspect may correspond to any one of the first aspect and the possible designs of the first aspect or any one of the second aspect and the possible designs of the second aspect. Therefore, similar technical effects can be brought. Details are not described herein again.

DESCRIPTION OF EMBODIMENTS

Figure 1:
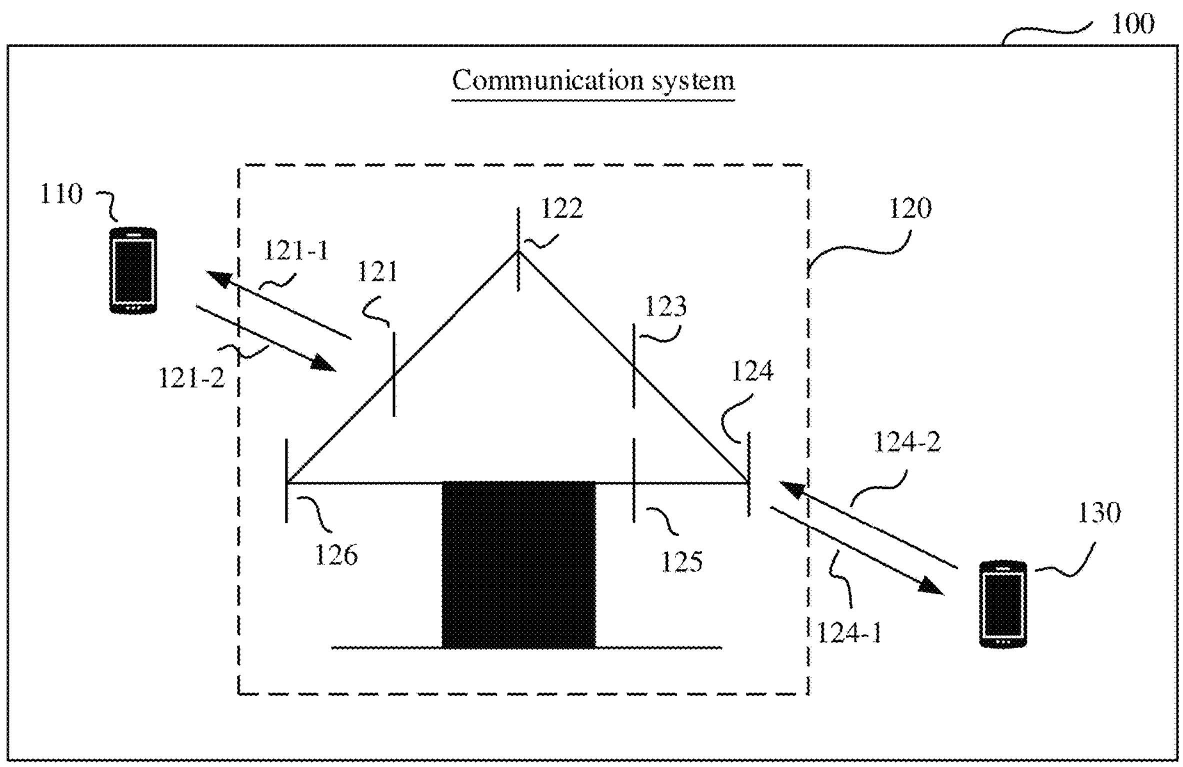
FIG. 1 is a schematic composition diagram of a communication system according to an embodiment of this application.

When indicating a terminal to perform mobility measurement (namely, layer 3 (layer 3, L3) measurement), a network device may deliver a configuration message to the terminal, so that the terminal can receive the configuration message, and perform corresponding mobility measurement based on the configuration message. For example, the mobility measurement may be synchronization signal block-based (Synchronization Signal and PBCH block based, SSB based) mobility measurement.

For example, during SSB-based mobility measurement, the terminal may receive a configuration message that includes a synchronization signal block-based measurement timing configuration (SSB based measurement timing configuration, SMTC) and that is sent by the network device. One SMTC may be used to indicate the terminal to perform mobility measurement on one or more MOs. In an example, the SMTC may include different access resources (where in this embodiment of this application, a resource of an MO in the SSB-based mobility measurement may be referred to as an SSB resource). The terminal may perform mobility measurement on different SSB resources indicated by the SMTC, and obtain corresponding measurement results.

Because the terminal can work only on one frequency at a same moment, the terminal can measure, at the moment, only an MO that uses the frequency as a center frequency. If a current working frequency of the terminal is different from a center frequency of a to-be-measured MO, the terminal needs to first switch the working frequency of the terminal to the center frequency corresponding to the MO (that is, perform RF tuning). To provide the terminal with an occasion for RF tuning, when delivering the configuration message to the terminal, the network device may further configure different measurement gaps for the terminal, so that the terminal can perform RF tuning in the gap and measure a corresponding MO. Generally, the network device simultaneously configures a plurality of MOs for the terminal to perform mobility measurement. More than one MO in the plurality of MOs can be measured only after RF tuning is performed. In other words, a plurality of MOs need to contend for the gap. To cope with this case, the terminal needs to determine a scaling factor of each MO, to determine a corresponding measurement requirement accordingly, for example, determine measurement sequences of different MOs in time domain.

Correspondingly, when the current working frequency of the terminal is the same as the center frequency of the to-be-measured MO, the terminal may perform corresponding measurement without performing RF tuning. In this embodiment of this application, measurement performed without RF tuning may be referred to as measurement outside the gap. It is similar to the foregoing descriptions of the case in which measurement can be performed only when RF tuning is needed that, generally, a plurality of MOs need to be measured outside the gap. Due to a limitation of software and hardware implementation of the terminal, the plurality of MOs need to contend for a measurement occasion outside the gap. Therefore, for an MO measured outside the gap, the terminal also needs to determine a scaling factor of the MO, to determine a corresponding measurement requirement.

In addition, there is another special case: Mobility measurement of the to-be-measured MO does not require a gap (for example, a center frequency of the to-be-measured MO is in an active bandwidth part (active BWP) of the terminal), but a measurement occasion of the to-be-measured MO completely coincides with the gap in time domain. In this case, the to-be-measured MO also needs to contend for the gap to obtain a measurement occasion. Therefore, for such an MO, the terminal also needs to determine a scaling factor of the MO, to determine a corresponding measurement requirement based on the scaling factor.

To determine scaling factors of different MOs in an SSB-based mobility measurement process, in a current technology, a carrier-specific scaling factor (CSSF) is proposed as a configuration reference of the scaling factor. For example, CSSFs corresponding to the MOs may be classified into a $CSSF_{withingap}$ and a $CSSF_{outsidegap}$ depending on whether the MO needs a gap for measurement. For an MO that needs to contend for the gap, where to be specific, a plurality of SSB resources (or referred to as SSB carriers) included in the MO are completely covered by the gap, the terminal may calculate a $CSSF_{withingap}$ of the MO based on an SMTC of each SSB carrier configured by the network device. For an MO measured outside the gap, where to be specific, SSB carriers included in the MO have measurement occasions outside the gap, the terminal may calculate a $CSSF_{outsidegap}$ of the MO based on an SMTC of each SSB carrier configured by the network device. For specific calculation methods of the $CSSF_{withingap}$ and the $CSSF_{outsidegap}$, refer to corresponding descriptions in related chapters in specification requirements (namely, R15.38.133) that are about support of radio resource management and that are publicized by the 3rd Generation Partnership Project (3rd Generation Partnership Project, 3GPP). Details are not described herein again.

It should be noted that, in SSB-based mobility measurement, although different resources included in a same MO may have different time domain offsets, a periodicity of each resource is fixed. Therefore, the network device configures the terminal to perform SSB-based mobility measurement, and it is difficult to cover all resources that need to be measured. Consequently, flexibility of the mobility configuration of the network device is poor.

Currently, in CSI-RS based mobility measurement, because different resources included in a measured MO may have different periodicities and offsets, higher flexibility of mobility measurement configuration can be provided for the network device. In this embodiment of this application, a resource of an MO in the CSI-RS based mobility measurement may be referred to as a CSI-RS resource.

It is similar to SSB-based mobility measurement that, in CSI-RS based mobility measurement, the terminal also needs to determine a scaling factor corresponding to each MO. However, a method for determining a scaling factor in the CSI-RS based mobility measurement is not specified in the current technology. In addition, because flexibility of an MO configured by the network device is high in the CSI-RS based mobility measurement, the method for determining the scaling factor in the SSB-based mobility measurement cannot be directly used. Therefore, to implement the CSI-RS based mobility measurement, a solution is required to provide a method for determining a scaling factor of a corresponding MO.

According to the mobility measurement method provided in this embodiment of this application, a method for determining a scaling factor of an MO in CSI-RS based mobility measurement is provided, to implement the CSI-RS based mobility measurement.

FIG. 1 is a schematic composition diagram of a communication system 100 according to an embodiment of this application. As shown in FIG. 1, the communication system 100 may include a terminal 110 and a network device 120. The communication system 100 may further include a terminal other than the terminal 110 shown in the figure, for example, a terminal 130 shown in FIG. 1. A quantity of terminals included in the communication system 100 is not limited in this embodiment of this application. For example, the terminal (which may also be referred to as user equipment (UE)) in this embodiment of this application may be a mobile phone, a tablet computer, a desktop computer, a laptop computer, a handheld computer, a notebook computer, an ultra-mobile personal computer (UMPC), a netbook, or a device such as a cellular phone, a personal digital assistant (PDA), an augmented reality (AR)/virtual reality (VR) device, or a media player. A specific form of the device is not specially limited in this embodiment of this application.

The network device 120 may be a base station corresponding to a 3rd generation mobile communication technology (3rd Generation, 3G), a 4th generation mobile communication technology (4th generation mobile communication technology, 4G), or a 5th generation mobile communication technology (5th generation mobile network, 5G). For example, when the network device 120 is a 5G base station, a 5G new radio (NR) can be provided to perform 5G communication with another device (for example, the terminal 110 and/or the terminal 130). The network device 120 may include a plurality of antennas, for example, an antenna 121, an antenna 122, an antenna 123, an antenna 124, an antenna 125, and an antenna 126 shown in FIG. 1. In addition, the network device 120 may additionally include a transmitter chain and a receiver chain. A person of ordinary skill in the art may understand that the transmitter chain and the receiver chain each may include a plurality of components (for example, a processor, a modulator, a multiplexer, an encoder, a demultiplexer, and an antenna) related to signal sending and receiving.

As shown in FIG. 1, the terminal 110 communicates with the antenna 121. The antenna 121 sends information to the terminal 110 through a forward link 121-1 (which may also be referred to as a downlink), and receives information from the terminal 110 through a reverse link 121-2 (which may also be referred to as an uplink). Similarly, the terminal 130 communicates with the antenna 124. The antenna 124 sends information to the terminal 130 by using a forward link 124-1, and receives information from the terminal 130 by using a reverse link 124-2.

It should be noted that the communication system 100 may be a public land mobile network (PLMN), a device-to-device (D2D) network, a machine-to-machine (M2M) network, or another network. FIG. 1 is merely a simplified schematic diagram of an example, and the network may further include another network device, which is not shown in FIG. 1.

In an example, in this embodiment of this application, the network device 120 may be configured to send one or more configuration messages to a terminal (for example, the terminal 110 and/or the terminal 130), to configure an MO. After receiving the configuration message, the terminal may perform, based on the configuration message, mobility measurement on the MO configured by the network device 120. For example, when the MO configured by using the configuration message includes a CSI-RS resource, the terminal may perform CSI-RS based mobility measurement based on the configuration message. When the MO configured by using the configuration message includes an SSB resource, the terminal may perform SSB-based mobility measurement based on the configuration message. It should be noted that, in an implementation, the MO configured by the network device and received by the terminal may further include both the SSB resource and the CSI-RS resource, and the terminal may separately measure the SSB resource and the CSI-RS resource that are included in the MO. A specific implementation is explained in detail in the following descriptions, and details are not described herein again.

The mobility measurement methods provided in embodiments of this application are all applicable to the communication system 100 shown in FIG. 1. The following describes the mobility measurement methods provided in embodiments of this application in detail with reference to the accompanying drawings.

Figure 2:
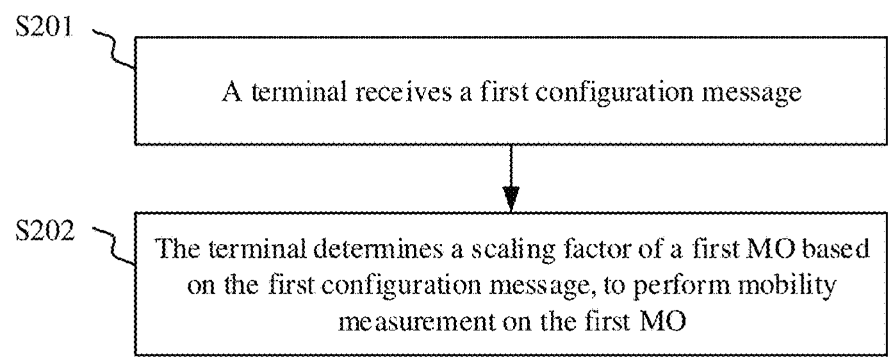
FIG. 2 is a schematic flowchart of a mobility measurement method according to an embodiment of this application.

FIG. 2 is a schematic flowchart of a first mobility measurement method according to an embodiment of this application. The method is applied to the terminal 110 and/or the terminal 130 shown in FIG. 1, and another terminal existing in the communication system 100, to implement CSI-RS based mobility measurement. An MO including a CSI-RS resource is referred to as a CSI-RS MO. For example, a network device configures a plurality of to-be-measured CSI-RS MOs for a terminal, and a first MO is any one of the plurality of CSI-RS MOs. As shown in FIG. 2, the method may include S201 and S202.

S201: The terminal receives a first configuration message.

The first configuration message is used to configure one CSI-RS MO (for example, the first MO), and the first MO includes one or more CSI-RS resources. To be specific, when the network device expects the terminal to perform mobility measurement, the network device may configure the first configuration message for the terminal, to indicate the terminal to perform mobility measurement on a CSI-RS MO that is configured in the first configuration message and that includes one or more CSI-RS resources. For example, the first configuration message may be sent by the network device by using radio resource control (RRC) information and delivered to the terminal through a downlink.

The first measurement configuration message may include information related to the first MO and configuration message for performing mobility measurement on the first MO.

In an example, the information related to the first MO may include a center frequency of the first MO, and periodicities and offsets of different CSI-RS resources in the first MO. Frequencies of different CSI-RS resources included in an MO are the same as a center frequency of the MO. The terminal may determine, based on the center frequency of the MO and the periodicities and offsets of the different CSI-RS resources in the first MO, the time domain positions of the to-be-measured first MO and the CSI-RS resources included in the first MO, and further determine measurement configurations for the first MO and the different CSI-RS resources in the first MO. For example, the terminal may determine, based on the center frequency of the first MO and the time domain positions of the different CSI-RS resources, whether RF tuning needs to be performed for measurement.

The mobility measurement configuration message may include mobility measurement items performed on the different CSI-RS resources in the first MO. For example, the mobility measurement items may include a reference signal received power (RSRP), and/or reference signal received quality (RSRQ), and/or a signal to interference plus noise ratio (SINR). Certainly, the mobility measurement items may alternatively include another parameter that can represent communication quality of a corresponding CSI-RS resource. This is not limited in this embodiment of this application.

It should be noted that in some other examples, the first configuration message may further include gap information configured by the network device for the terminal, for example, a start position or an offset of the gap and a periodicity of the gap, so that the terminal can measure, within the gap, an MO on which RF tuning needs to be performed. Certainly, the gap information may not be included in the first configuration message, but is sent to the UE in another manner. This is not limited in this embodiment of this application.

S202: The terminal determines a scaling factor of the first MO based on the first configuration message, to perform mobility measurement on the first MO.

In this embodiment of this application, a method for determining a scaling factor of a CSI-RS MO measured in a gap (that is, a CSI-RS MO that needs to contend for a gap for measurement) is different from a method for determining a scaling factor of a CSI-RS MO measured outside a gap. Therefore, the terminal first needs to determine, based on the first configuration message, whether the first MO needs to contend for the gap for measurement, or whether the first MO can be measured outside the gap.

For example, the terminal may determine, depending on whether a CSI-RS resource that completely coincides with the gap exists in the first MO, whether the first MO needs to contend for the gap for measurement, or whether the first MO can be measured outside the gap.

Figure 3:
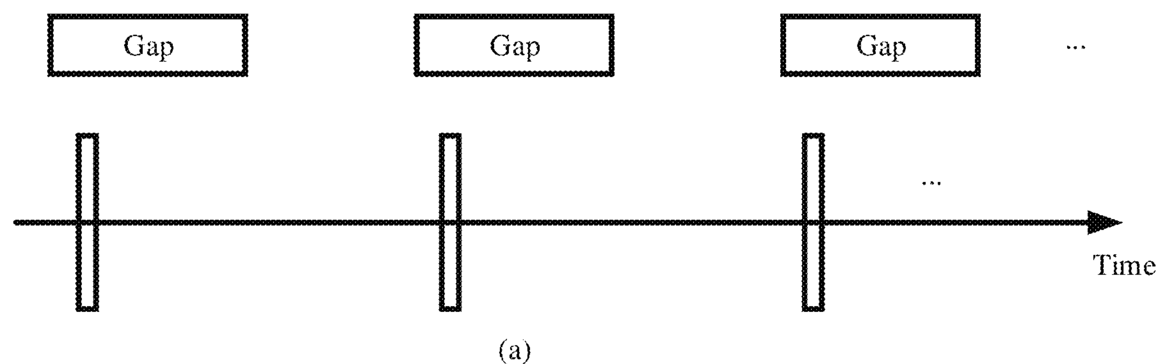
FIG. 3 is a schematic diagram of a method of determining whether a CSI-RS resource completely coincides with a gap according to an embodiment of this application.
Figure 3:
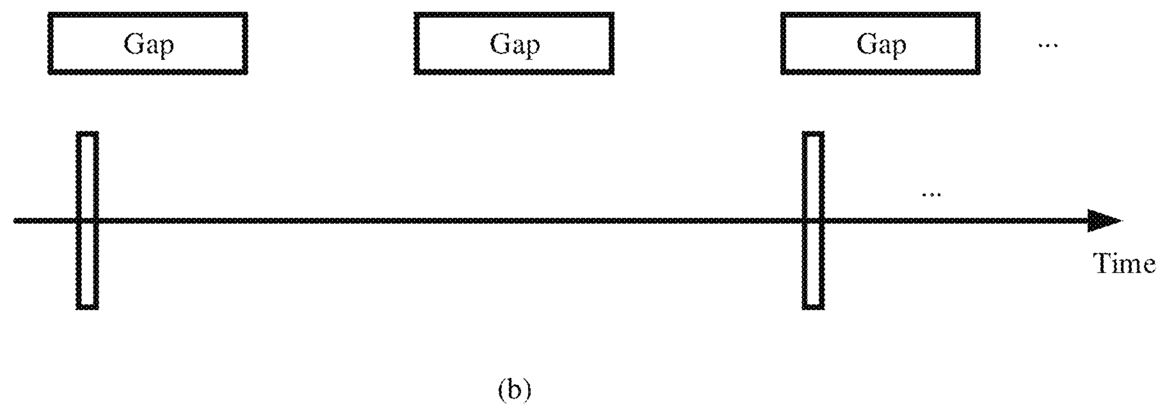

In an implementation, if a CSI-RS resource appears in the gap every time and does not appear outside the gap, it is considered that the CSI-RS resource completely coincides with the gap. For example, refer to FIG. 3. As shown in (a) in FIG. 3, each time a CSI-RS resource appears, the CSI-RS resource coincides with a gap in time domain. Therefore, the CSI-RS resource completely coincides with the gap. It should be noted that, when CSI-RS resources appear at an interval of a specific periodicity, gaps that coincide with the CSI-RS resources may be adjacent or not adjacent. For example, as shown in (b) in FIG. 3, when a CSI-RS resource appears for the second time, the CSI-RS resource coincides with a gap in the third periodicity in time domain. Provided that the CSI-RS overlaps with a gap each time the CSI-RS appears, it is considered that the CSI-RS resource also completely coincides with the gap.

On the contrary, if a CSI-RS resource appears outside the gap in a periodicity, it is considered that the CSI-RS resource does not completely coincide with the gap.

With reference to positions of resources in an MO, the following describes, by using examples, whether the MO needs to contend for a gap. For example, to-be-measured CSI-RS MOs include an MO 1 and an MO 2, the MO 1 includes a resource 1 and a resource 2, the MO 2 includes a resource 3, and the resource 1, the resource 2, and the resource 3 are all CSI-RS resources. A periodicity of the gap is T1, a periodicity of the resource 1 is T2, a periodicity of the resource 2 is T3, and a periodicity of the resource 3 is T4. For a distribution status thereof in time domain, refer to FIG. 4. It can be learned that in CSI-RS based mobility measurement, offsets and periodicities of different resources included in a same MO (for example, the MO 1) may be different.

Figure 4:
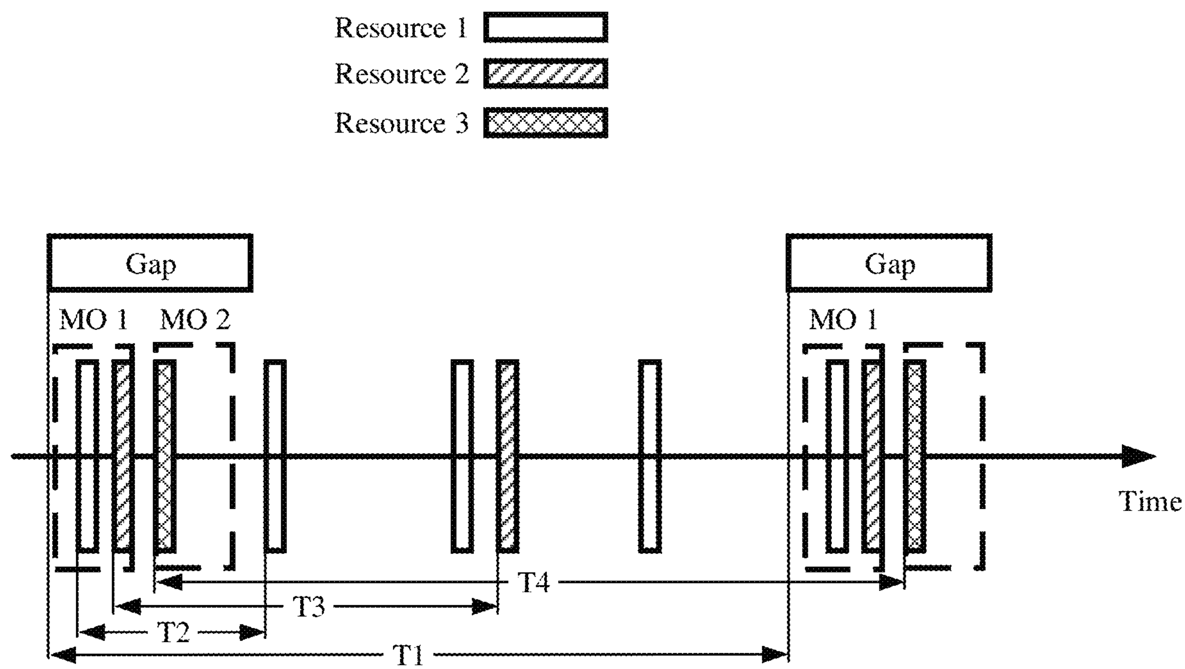
FIG. 4 is a schematic diagram of distribution of MO resources in time domain according to an embodiment of this application.

As shown in FIG. 4, after the periodicity T2, the resource 1 appears outside the gap. Therefore, the resource 1 is not a resource that completely coincides with the gap. Similarly, after the periodicity T3, the resource 2 appears outside the gap. Therefore, the resource 2 is not a resource that completely coincides with the gap. Each time the resource 3 appears, the resource 3 coincides with the gap in time domain. Therefore, the resource 3 completely coincides with the gap.

In other words, neither the resource 1 nor the resource 2 included in the MO 1 is a resource that completely coincides with the gap. In other words, there is no resource that completely coincides with the gap in the MO 1. Therefore, when the first MO is the MO 1, the first MO is an MO measured outside the gap. The resource 3 included in the MO 2 completely coincides with the gap. Therefore, when the first MO is the MO 2, the first MO is an MO that needs to contend for the gap for measurement.

It should be noted that, in the example shown in FIG. 4, all resources (that is, the resources 3) included in the MO 2 completely coincide with the gap. Therefore, the MO 2 needs to contend for the gap for measurement. In some other embodiments, when the CSI-RS MO includes only a part of resources that completely coincide with the gap, the terminal may also consider that the CSI-RS MO needs to contend for the gap for measurement.

Figure 5:
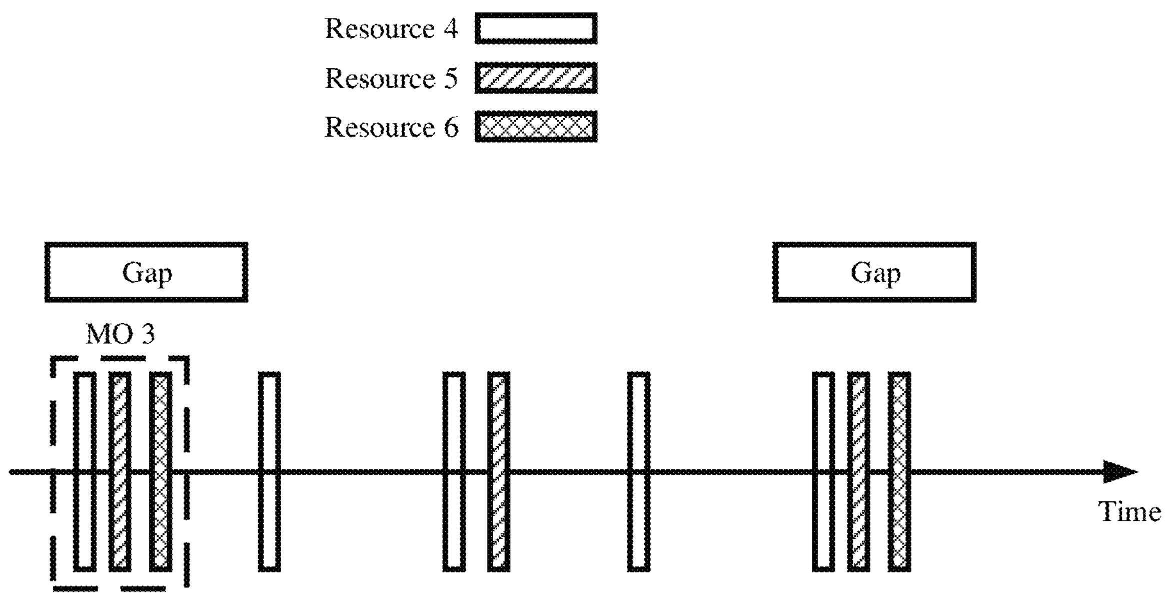
FIG. 5 is a schematic diagram of another distribution of MO resources in time domain according to an embodiment of this application.

For example, refer to FIG. 5. A to-be-measured CSI-RS MO includes an MO 3, the MO 3 includes a resource 4, a resource 5, and a resource 6, and the resource 4, the resource 5, and the resource 6 are all CSI-RS resources. As shown in FIG. 4, in time domain, neither the resource 4 nor the resource 5 is a resource that completely coincides with the gap. However, because the resource 6 completely coincides with the gap, the MO 3 includes a resource that completely coincides with the gap. In other words, the MO 3 needs to contend for the gap for measurement.

The terminal may determine, according to the foregoing method, whether each to-be-measured CSI-RS MO is an MO that needs to contend for the gap for measurement or an MO that can be measured outside the gap. On this basis, a scaling factor of each CSI-RS MO is determined, to perform mobility measurement on the CSI-RS MO.

For example, the terminal may use a $CSSF_{withingap}$ of an MO that needs to contend for a gap for measurement as a scaling factor of the MO. The terminal may use a $CSSF_{outsidegap}$ of an MO measured outside a gap as a scaling factor of the MO.

The following provides an example for description with reference to FIG. 4 and FIG. 5. To-be-measured CSI-RS MOs include an MO 1, an MO 2, an MO 3, an MO 4, and an MO 5, where the MO 4 is an MO measured outside a gap, and the MO 5 is an MO that needs to contend for a gap for measurement. It is similar to the foregoing example that, the MO 1 is an MO measured outside a gap, and the MO 2 and the MO 3 are MOs that need to contend for a gap for measurement. Therefore, the terminal may separately determine $CSSFs_{withingap}$ of the MO 2, the MO 3, and the MO 5 that need to contend for the gap for measurement as scaling factors of the corresponding MOs. The terminal may separately determine $CSSFs_{outsidegap}$ of the MO 1 and the MO 4 that are measured outside the gap, and determine scaling factors of the corresponding MOs based on the $CSSFs_{outsidegap}$.

In other words, when a first MO is the MO 2, the MO 3 and the MO 5 may constitute a second MO. The terminal may obtain a $CSSF_{withingap}$ of the first MO through calculation based on configuration message of the first MO and the second MO, and use the $CSSF_{withingap}$ as a scaling factor of the first MO.

When the first MO is the MO 1, the MO 4 may be referred to as a fourth MO. The terminal may obtain a $CSSF_{outsidegap}$ of the first MO through calculation based on configuration message of the first MO and the fourth MO, and determine the scaling factor of the first MO based on the $CSSF_{outsidegap}$.

It should be noted that, it is different from a case in which only one CSI-RS MO can be measured in one gap that, when measurement is performed outside the gap, the UE may perform mobility measurement on a plurality of MOs simultaneously. However, due to a limitation of a searcher capability of the terminal, the terminal cannot simultaneously measure all CSI-RS MOs measured outside the gap. Therefore, in some embodiments, the scaling factor further needs to be determined with reference to the searcher capability of the terminal, to ensure that when measurement is performed outside the gap based on the scaling factor, a quantity of CSI-RS MOs simultaneously measured does not exceed a maximum quantity within the searcher capability of the terminal.

In addition, in a process of determining a requirement of CSI-RS based mobility measurement, the terminal further needs to determine a CSI-RS periodicity of a corresponding MO (for example, the first MO). For example, when the first MO is an MO that needs to contend for the gap for measurement, the CSI-RS periodicity of the first MO may be equal to a largest periodicity of all CSI-RS resources that are included in the first MO and that completely coincide with the gap. When the first MO is an MO measured outside the gap, the CSI-RS periodicity of the first MO may be equal to a largest periodicity of all CSI-RS resources included in the first MO.

For example, when the first MO is the MO 1 in FIG. 4, because the MO 1 is an MO measured outside the gap, and a maximum periodicity of CSI-RS resources included in the MO 1 is the periodicity T3 corresponding to the resource 2, in this case, the CSI-RS periodicity of the MO 1 is T3.

When the first MO is the MO 3 in FIG. 5, because the MO 3 is an MO that needs to contend for a gap for measurement, and a periodicity of a CSI-RS resource (namely, the resource 6) included in the MO 3 that completely coincides with the gap is T5 (not shown in the figure), in this case, the CSI-RS periodicity of the MO 3 is T5. Certainly, if there is another CSI-RS resource in the MO 3 that completely coincides with the gap, and a periodicity of the CSI-RS resource is longer than T5, the CSI-RS periodicity of the MO 3 may also be correspondingly adjusted. For example, a periodicity of a resource that has a longest periodicity and is included in the MO 3 is used as the CSI-RS periodicity of the MO 3.

Figure 6:
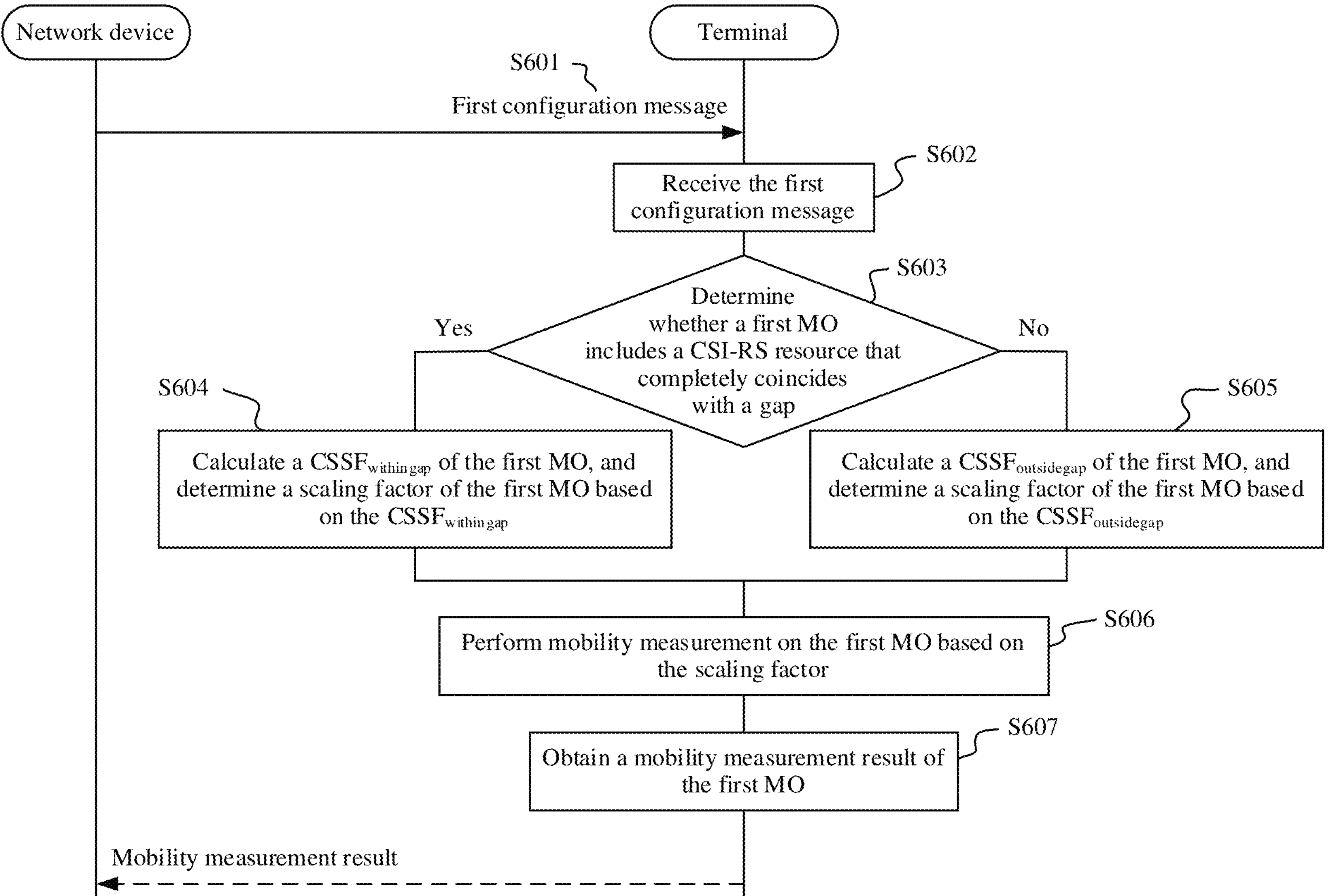
FIG. 6 is a schematic flowchart of another mobility measurement method according to an embodiment of this application.

To describe the mobility measurement method provided in embodiments of this application more clearly, refer to FIG. 6. FIG. 6 is a schematic flowchart of a specific execution example of mobility measurement in the communication system shown in FIG. 1. As shown in FIG. 6, the method may include S601 to S607.

S601: A network device configures a first configuration message for a terminal. The first configuration message is used to configure a first MO including one or more CSI-RS resources.

S602: The terminal receives the first configuration message.

S603: The terminal determines whether the first MO includes a CSI-RS resource that completely coincides with a gap.

When determining that the first MO includes a CSI-RS resource that completely coincides with the gap, that is, the first MO needs to contend for the gap for measurement, the terminal performs the following S604; or when determining that the first MO does not include a CSI-RS resource that completely coincides with the gap, that is, the first MO is measured outside the gap, the terminal performs the following S605.

S604: The terminal calculates a $CSSF_{withingap}$ of the first MO, and determines a scaling factor of the first MO based on the $CSSF_{withingap}$.

S605: The terminal calculates a $CSSF_{outsidegap}$ of the first MO, and determines a scaling factor of the first MO based on the $CSSF_{outsidegap}$.

S606: The terminal performs mobility measurement on the first MO based on the scaling factor.

S607: The terminal obtains a mobility measurement result of the first MO.

After obtaining the mobility measurement result, the terminal may perform corresponding processing on the mobility measurement result. For example, the terminal sends the measurement result to the network device.

It should be noted that, the foregoing examples are described by using an example in which the to-be-measured MO includes only the CSI-RS resource. It may be understood that, in some implementation scenarios, the to-be-measured MO may also include an SSB resource.

For example, in some embodiments, the SSB resource may be delivered by the network device to the terminal in a configuration message when the network device configures the first MO, where the configuration message is the same as that used for delivering the CSI-RS resource. That the first configuration message in the network device corresponds to performing mobility measurement on an MO-1 is used as an example. When the network device delivers, to the terminal, the configuration of the MO-1 for performing mobility measurement, the MO-1 may include both an SSB resource and a CSI-RS resource. After receiving the configuration of the MO-1, the terminal may divide the MO-1 into an MO-2 and an MO-3 for separate processing. The MO-2 may include all SSB resources in the MO-1, and the MO-3 may include all CSI-RS resources in the MO-1 (in this example, the MO-3 may be the first MO in the foregoing example). In this way, data processing disorder caused by obfuscated processing performed by the terminal on resources with different characteristics can be avoided.

In some other embodiments, the SSB resource may also be indicated by an associatedSSB identifier carried in the first MO when the network device configures the first MO. In this case, although an MO delivered by the network device does not include a specific SSB measurement configuration, the terminal may determine, based on a center frequency indicated by the identifier, an MO that needs to perform mobility measurement and that includes the SSB resource.

In some other embodiments, the SSB resource may alternatively be delivered by the network device to the terminal by delivering another configuration message (for example, a second configuration message) different from the first configuration message including the first MO. For example, the first configuration message corresponds to performing CSI-RS based mobility measurement on an MO-4 (where in this example, the MO-4 may correspond to the first MO in the foregoing example), and the second configuration message corresponds to performing mobility measurement on an MO-5. The network device may deliver an MO-4 to the terminal for performing mobility measurement, where the MO-4 may include a measurement configuration related to the first MO. The network device may alternatively deliver an MO-5 to the terminal for performing mobility measurement, where the MO-5 may include a measurement configuration for performing measurement on the SSB resource.

Certainly, in addition to the foregoing examples, the SSB resource may alternatively be obtained by the terminal through another channel. For example, the terminal may obtain, within preset time, the SSB resource by receiving a broadcast message sent by the network device. This is not limited in this embodiment of this application.

It may be understood that when a to-be-measured MO includes only the SSB resource, the method in the current technology may be successfully performed. However, when the to-be-measured MO includes both the SSB resource and the CSI-RS resource, the terminal needs to determine a scaling factor of each MO based on a specific situation.

For example, in some embodiments, when calculating a scaling factor of each MO, the terminal may consider both an MO (for example, referred to as an SSB MO) including an SSB resource and an MO (for example, referred to as a CSI-RS MO) including a CSI-RS resource. For example, if a first MO including a CSI-RS resource needs to contend for a gap for measurement, when determining a scaling factor of the first MO, the terminal may use an SSB MO (for example, referred to as a third MO) including a resource that completely coincides with the gap as one of contention objects of the first MO. Based on this, the terminal may calculate a $CSSF_{withingap}$ corresponding to the first MO and use the $CSSF_{withingap}$ as the scaling factor of the first MO. For another example, if a first MO including a CSI-RS resource may be measured outside the gap, when determining a scaling factor of the first MO, the terminal may use an SSB MO (for example, referred to as a fifth MO) measured outside the gap as one of contention objects of the first MO. Based on this, the terminal may calculate a $CSSF_{outsidegap}$ corresponding to the first MO, and use the $CSSF_{outsidegap}$ as the scaling factor of the first MO.

Correspondingly, when calculating the scaling factor of the SSB MO that needs to contend for the gap, the terminal may also use a CSI-RS MO that needs to contend for the gap as one of contention objects of the SSB MO. When calculating the scaling factor of the SSB MO measured outside the gap, the terminal may also use the CSI-RS MO measured outside the gap as one of contention objects of the SSB MO.

In some other embodiments, the terminal may separately consider the CSI-RS MO and the SSB MO when calculating the scaling factor of each MO. In other words, the terminal may separately measure the CSI-RS MO and the SSB MO, and the two measurement methods do not interfere with each other. For example, if a first MO including a CSI-RS resource needs to contend for a gap for measurement, when determining a scaling factor of the first MO, the terminal may consider only another CSI-RS MO that needs to contend for the gap for measurement. Based on this, the terminal may calculate a $CSSF_{withingap}$ corresponding to the first MO, and use the $CSSF_{withingap}$ as the scaling factor of the first MO. For another example, if a first MO including a CSI-RS resource that may be measured outside the gap, when determining a scaling factor of the first MO, the terminal may consider only another CSI-RS MO that is measured outside the gap. Based on this, the terminal may calculate a $CSSF_{outsidegap}$ corresponding to the first MO, and use the $CSSF_{outsidegap}$ as the scaling factor of the first MO.

Correspondingly, when calculating a scaling factor of an SSB MO that needs to contend for the gap, the terminal may consider only the SSB MO that needs to contend for the gap. When calculating the scaling factor of the SSB MO measured outside the gap, the terminal may consider only the SSB MO measured outside the gap.

It should be noted that, in the foregoing descriptions, two possible implementations in which the terminal determines the scaling factor of the CSI-RS MO are provided, which are respectively as follows:

1. When determining the scaling factor of the CSI-RS MO that needs to contend for the gap, the terminal needs to consider the SSB MO (namely, the third MO) that needs to contend for the gap and that is in the to-be-measured MO; or when determining the scaling factor of the CSI-RS MO measured outside the gap, the terminal needs to consider the SSB MO (namely, the fifth MO) that is measured outside the gap and that is in the to-be-measured MO.

2. When determining the scaling factor of the CSI-RS MO that needs to contend for the gap, the terminal does not consider the third MO, and considers only a CSI-RS MO (namely, a second MO) that needs to contend for the gap and that is in the to-be-measured MO; when determining the scaling factor of the CSI-RS MO measured outside the gap, the terminal does not need to consider the fifth MO, and only considers a CSI-RS MO (namely, a fourth MO) that is measured outside the gap and that is in the to-be-measured MO.

In some other implementations, the terminal may consider different SSB MOs when determining a scaling factor of a CSI-RS MO that needs to contend for a gap and when determining a scaling factor of a CSI-RS MO measured outside the gap. For example, when determining the scaling factor of the CSI-RS MO that needs to contend for the gap, the terminal needs to consider an SSB MO that needs to contend for the gap and that is in the to-be-measured MO; when determining the scaling factor of the CSI-RS MO measured outside the gap, the terminal does not need to consider an SSB MO that is measured outside the gap and that is in the to-be-measured MO, and only needs to consider a CSI-RS MO that is measured outside the gap and that is in the to-be-measured MO. Alternatively, when determining the scaling factor of the CSI-RS MO that needs to contend for the gap, the terminal does not consider the SSB MO that needs to contend for the gap and that is in the to-be-measured MO, and considers only a CSI-RS MO that needs to contend for the gap and that is in the to-be-measured MO; when determining the scaling factor of the CSI-RS MO measured outside the gap, the terminal needs to consider the SSB MO that is measured outside the gap and that is in the to-be-measured MO.

The terminal may flexibly select a specific implementation based on a requirement of the terminal. This is not limited in this embodiment of this application.

It should be noted that, in the foregoing descriptions in this embodiment of this application, an example in which the network device configures a gap for RF tuning for the terminal is used. In some other embodiments, the network device may not configure the gap for RF tuning for the terminal, so that the terminal does not receive gap-related information. In this case, the terminal may consider that all MOs configured by the network device for the terminal are MOs measured outside the gap. That is, scaling factors of these MOs in a mobility measurement process are determined on the premise that these MOs are measured outside the gap. A specific measurement method thereof is similar to the method in the foregoing embodiment, and details are not described herein again.

Figure 7:
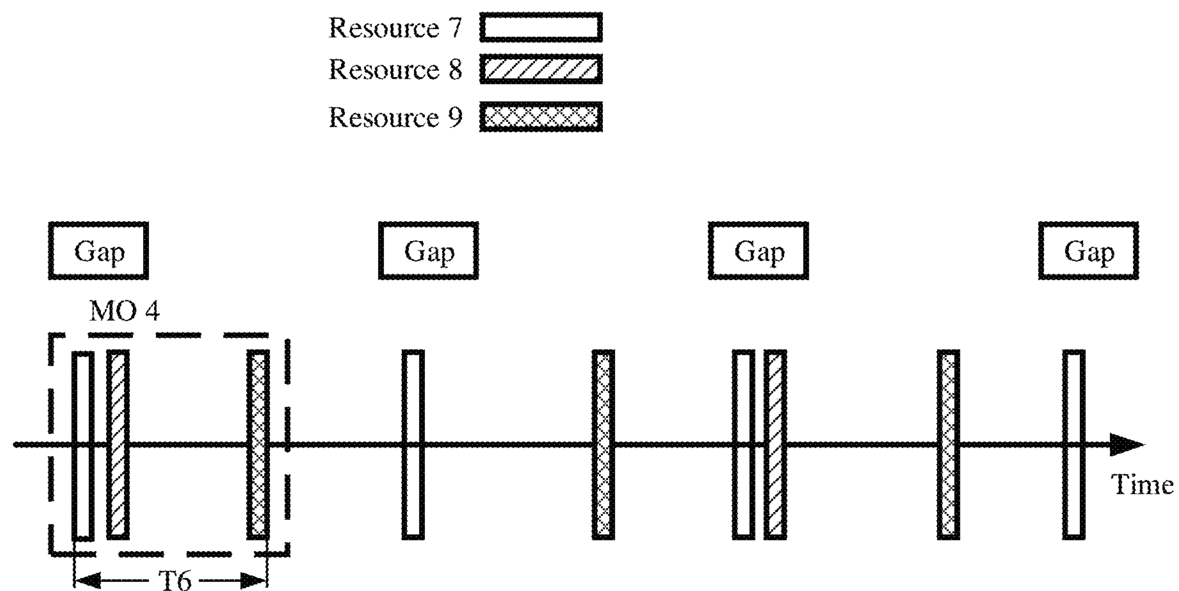
FIG. 7 is a schematic diagram of another distribution of MO resources in time domain according to an embodiment of this application.

In addition, in an actual implementation process, resource distribution in the MO may be different from that shown in FIG. 4 or FIG. 5. For example, as shown in FIG. 7, an MO 4 includes a resource 7, a resource 8, and a resource 9. Based on offsets of the resource 7, the resource 8, and the resource 9 in time domain, it may be determined that at least T6 duration is required for performing measurement once on all resources in the MO 4. Apparently, T6 is greater than a length of the gap. In other words, only part of resources in the MO 4 are covered by a measurement gap length (MGL). In this case, it is difficult for the terminal to determine whether the MO 4 needs to contend for the gap for measurement. Therefore, in this embodiment of this application, the network device may not configure, for the terminal, mobility measurement on an MO in which only part of included CSI-RS resources are covered by the MGL. However, if the network device configures, for the terminal, mobility measurement on the MO in which only part of the included CSI-RS resources are covered by the MGL, a method for measuring the MO by the terminal may be flexibly determined based on a status of the terminal. This is not limited in this embodiment of this application.

In this way, based on the mobility measurement method provided in this embodiment of this application, the UE may determine, depending on whether there is a CSI-RS resource that completely coincides with the measurement gap in the first MO, a method for determining a scaling factor of an MO including the CSI-RS resource, so that the terminal can perform CSI-RS based mobility measurement accurately based on the configuration message sent by the network device.

The foregoing mainly describes the solutions provided in embodiments of this application from a perspective of the terminal. To implement the foregoing functions, corresponding hardware structures and/or software modules for performing the functions are included. A person skilled in the art should easily be aware that, in combination with units and algorithm steps of the examples described in this embodiment disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal may be divided into function modules based on the foregoing method examples. For example, the terminal may include a mobility measurement apparatus, and the apparatus may be divided into function modules corresponding to the functions, or two or more functions may be integrated into one processing module. The integrated module may be implemented in a form of hardware, or may be implemented in a form of a software function module. It should be noted that, in this embodiment of this application, division into the modules is an example, and is merely a logical function division. In actual implementation, another division manner may be used.

Figure 8:
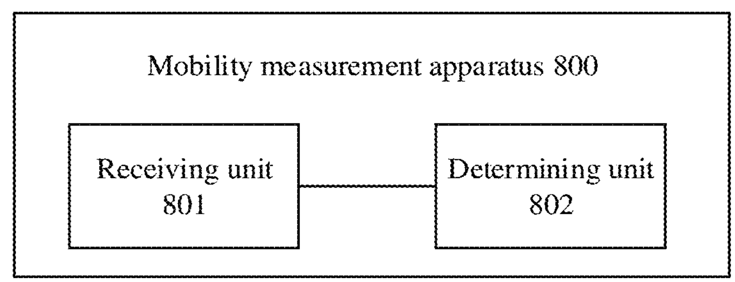
FIG. 8 is a schematic block diagram of a mobility measurement apparatus according to an embodiment of this application.

FIG. 8 is a schematic block diagram of a mobility measurement apparatus 800 according to an embodiment of this application. The mobility measurement apparatus 800 may be disposed in a terminal, and is configured to perform any mobility measurement method provided in embodiments of this application.

As shown in FIG. 8, the mobility measurement apparatus 800 may include a receiving unit 801 and a determining unit 802.

The receiving unit 801 is configured to receive a first configuration message, where the first configuration message is used to configure a first measurement object MO, and the first MO includes one or more channel state information reference signal CSI-RS resources. For example, the receiving unit 801 may be configured to perform S201 shown in FIGS. 2 and/or S602 shown in FIG. 6.

The determining unit 802 is configured to determine a scaling factor of the first MO depending on whether there is a CSI-RS resource in the first MO that completely coincides with a measurement gap, to perform mobility measurement on the first MO. For example, the determining unit 802 may be configured to perform S202 shown in FIGS. 2 and/or S603 to S605 shown in FIG. 6.

In some possible designs, the determining unit 802 is configured to: when there is at least one CSI-RS resource in the first MO that completely coincides with the gap, determine a carrier-specific scaling factor within the gap $CSSF_{withingap}$ of the first MO based on the first MO and an MO that needs to contend for the gap, and determine the $CSSF_{withingap}$ as a scaling factor of the first MO. The determining unit 802 is further configured to: when there is no CSI-RS resource in the first MO that completely coincides with the gap, determine a carrier-specific scaling factor outside the gap $CSSF_{outsidegap}$ of the first MO based on the first MO and an MO measured outside the gap, and determine the scaling factor of the first MO based on the $CSSF_{outsidegap}$.

In some possible designs, the MO that needs to contend for the gap includes a second MO and/or a third MO. The second MO includes a CSI-RS resource that coincides with the gap. The third MO includes a synchronization signal block SSB resource that coincides with the gap, where the SSB resource is an SSB for mobility measurement configured by a network device, and/or the SSB resource is an associatedSSB carried in the first MO.

In some possible designs, the first configuration message is further used to configure the third MO. Alternatively, the first MO carries an associated SSB associatedSSB identifier, and the associatedSSB identifier indicates to perform mobility measurement on the third MO.

In some possible designs, the receiving unit is further configured to receive a second configuration message, where the second configuration message is used to configure the third MO.

In some possible designs, the MO measured outside the gap includes a fourth MO and/or a fifth MO. There is no CSI-RS resource in the fourth MO that completely coincides with the gap. There is no SSB resource in the fifth MO that completely coincides with the gap.

In some possible designs, the first configuration message is further used to configure the fifth MO. Alternatively, the first MO carries an associatedSSB identifier, and the associatedSSB identifier indicates to perform mobility measurement on the fifth MO.

In some possible designs, the receiving unit 801 is further configured to receive a second configuration message, where the second configuration message is used to configure the fifth MO.

It should be noted that in some implementations, when the network device does not configure gap-related information for the terminal, or all MOs are measured outside the gap, the mobility measurement apparatus 800 shown in FIG. 8 may be further configured to implement another mobility measurement method. For example, the receiving unit 801 is configured to receive a first configuration message, where the first configuration message is used to configure a first MO, and the first MO includes one or more CSI-RS resources. The determining unit 802 is configured to: determine a $CSSF_{outsidegap}$ of the first MO based on the first MO and an MO measured outside the gap; and determine a scaling factor of the first MO based on the $CSSF_{outsidegap}$.

It should be noted that all related content of the steps in the foregoing method embodiments may be cited in function descriptions of corresponding functional modules. Details are not described herein again. The mobility measurement apparatus 800 provided in this embodiment of this application may be disposed in a terminal, and is configured to perform a corresponding mobility measurement method. Therefore, an effect the same as that of the foregoing mobility measurement method can be achieved. As an option rather than a necessity, if necessary, the mobility measurement apparatus 800 provided in this embodiment of this application may further include a processing module or a control module configured to support the receiving unit 801 and/or the determining unit 802 in completing a corresponding function.

An embodiment of this application further provides a communication apparatus. The communication apparatus may be a terminal or a circuit. The communication apparatus may be configured to perform actions performed by the terminal in the foregoing method embodiment.

Figure 9:
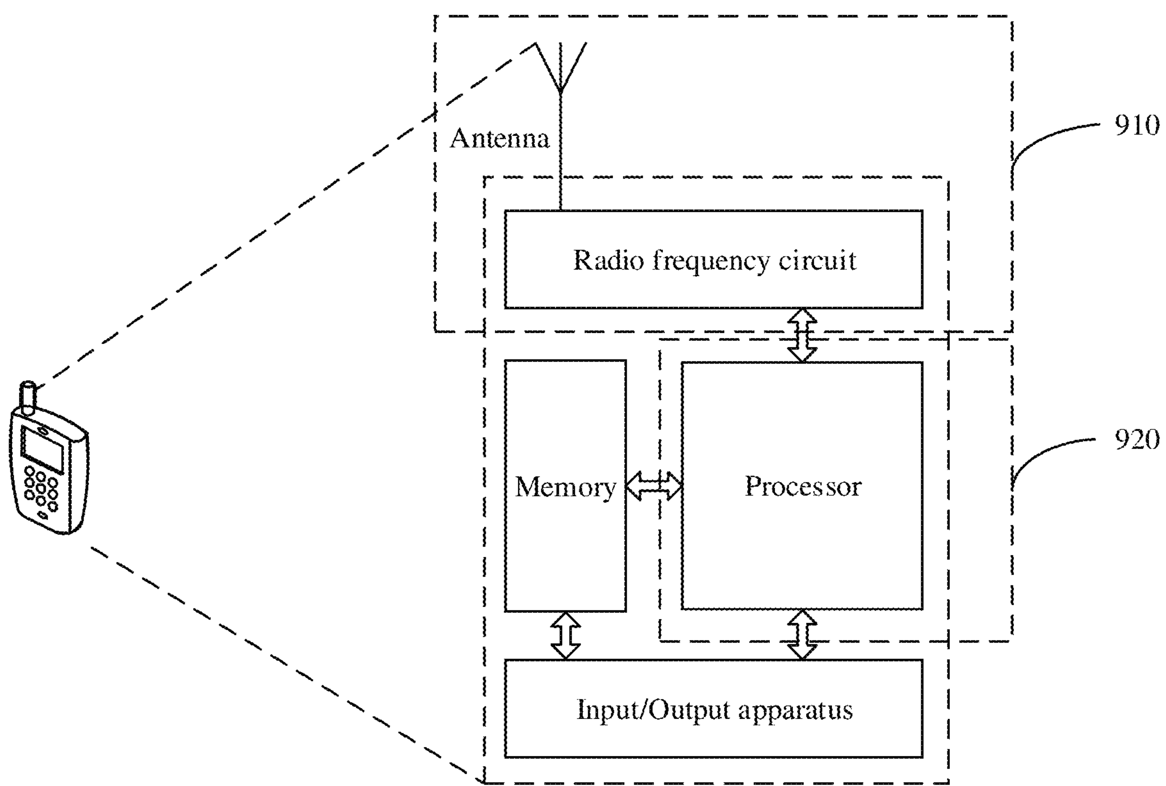
FIG. 9 is a schematic block diagram of a communication apparatus according to an embodiment of this application.

When the communication apparatus is a terminal, FIG. 9 is a simplified schematic diagram of a structure of the terminal. For ease of understanding and convenience of figure illustration, an example in which the terminal is a mobile phone is used in FIG. 9. As shown in FIG. 9, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that some types of terminals may not have the input/output apparatus.

When data needs to be sent, the processor performs baseband processing on the to-be-sent data, and outputs a baseband signal to the radio frequency circuit. After performing radio frequency processing on the baseband signal, the radio frequency circuit sends the radio frequency signal in the form of the electromagnetic wave through the antenna. When data is sent to the terminal, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal product, there may be one or more processors and one or more memories. The memory may also be referred to as a storage medium, a storage device, or the like. The memory may be disposed independent of the processor, or may be integrated into the processor. This is not limited in this embodiment of this application.

In this embodiment of this application, the antenna and the radio frequency circuit that have sending and receiving functions may be considered as a transceiver unit of the terminal, and the processor that has a processing function may be considered as a processing unit of the terminal. As shown in FIG. 9, the terminal includes a transceiver unit 910 and a processing unit 920. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

It should be understood that the transceiver unit 910 is configured to perform a sending operation and a receiving operation on a terminal side in the foregoing method embodiments, and the processing unit 920 is configured to perform an operation other than the receiving/sending operation of the terminal in the foregoing method embodiments.

For example, in an implementation, the transceiver unit 910 is configured to perform the receiving operation in S201 in FIG. 2, and/or the transceiver unit 910 is further configured to perform another receiving and sending step on the terminal side in this embodiment of this application. The processing unit 920 is configured to perform step 202 in FIG. 2, and/or the processing unit 920 is further configured to perform another processing step on the terminal side in this embodiment of this application.

For another example, in another implementation, the transceiver unit 910 is configured to perform S602 in FIG. 6, and/or the transceiver unit 910 is further configured to perform another receiving and sending step on the terminal side in this embodiment of this application. The processing unit 920 is configured to perform S603 to S607 in FIG. 6, and/or the processing unit 920 is further configured to perform another processing step on the terminal side in this embodiment of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 10:
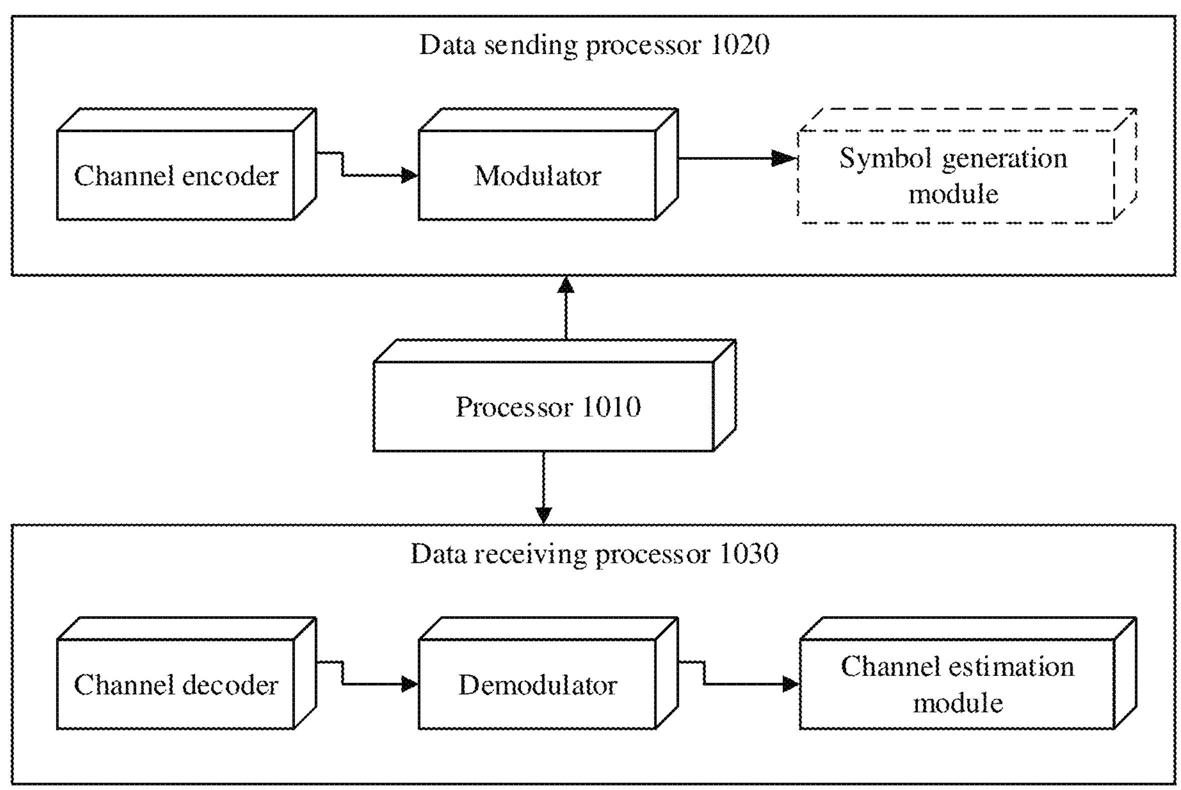
FIG. 10 is a schematic block diagram of another communication apparatus according to an embodiment of this application.

When the communication apparatus in this embodiment is a terminal, refer to a device shown in FIG. 10. In FIG. 10, the device includes a processor 1010, a data sending processor 1020, and a data receiving processor 1030. The receiving unit 801 in the foregoing embodiment may be the data receiving processor 1030 in FIG. 10, and completes a corresponding function. The determining unit 802 in the foregoing embodiment may be the processor 1010 in FIG. 10. When the terminal expects to feed back a mobility measurement result to the network device, the terminal may implement this function by using the data sending processor 1020. Although FIG. 10 shows a channel encoder and a channel decoder, it may be understood that these modules do not constitute a limitation on this embodiment and are merely examples.

Figure 11:
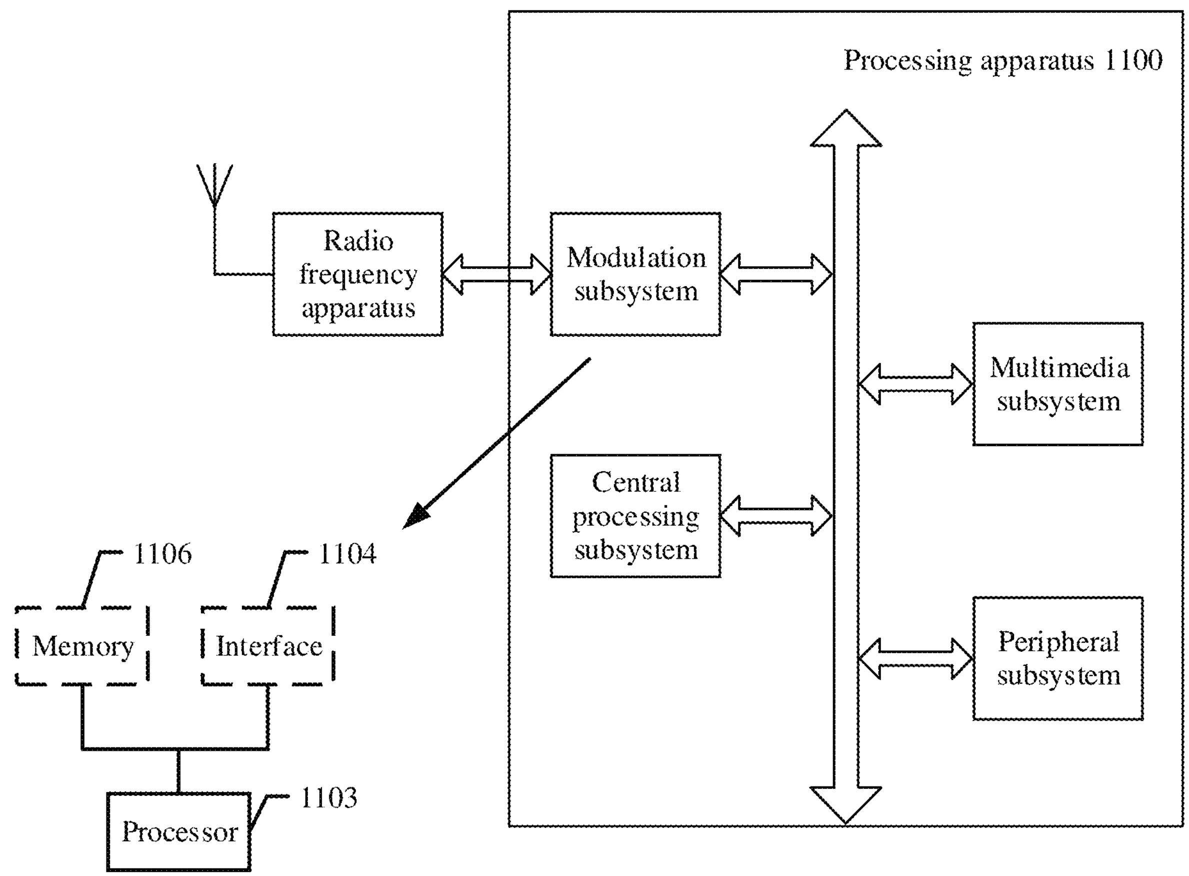
FIG. 11 is a schematic block diagram of another communication apparatus according to an embodiment of this application.

FIG. 11 shows another form of this embodiment. A processing apparatus 1100 includes modules such as a modulation subsystem, a central processing subsystem, and a peripheral subsystem. The communication apparatus in this embodiment may be used as the modulation subsystem. Specifically, the modulation subsystem may include a processor 1103 and an interface 1104. The processor 1103 completes a function of the determining unit 802, and the interface 1104 completes a function of the receiving unit 801. In another variation, the modulation subsystem includes a memory 1106, a processor 1103, and a program that is stored in the memory 1106 and that can be run on the processor. When executing the program, the processor 1103 implements the method on the terminal side in the foregoing method embodiments. It should be noted that the memory 1106 may be non-volatile or volatile. The memory 1106 may be located in the modulation subsystem, or may be located in the processing apparatus 1100, provided that the memory 1106 can be connected to the processor 1103.

Figure 12:
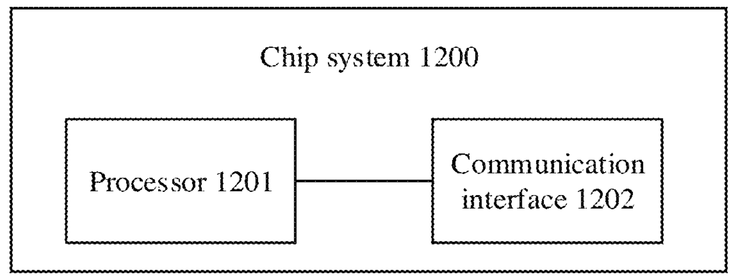
FIG. 12 is a schematic block diagram of another communication apparatus according to an embodiment of this application.

FIG. 12 is a schematic composition diagram of a chip system 1200 according to an embodiment of this application. The chip system 1200 may include a processor 1201 and a communication interface 1202, configured to support the terminal in implementing the functions in the foregoing embodiments. For example, the processor 1201 may communicate with another device (for example, a network device) other than the terminal through the communication interface 1202. In a possible design, the chip system further includes a memory. The memory is configured to store program instructions and data that are necessary for the terminal. The chip system may include a chip, or may include a chip and another discrete component. It should be noted that all related content of the steps in the foregoing method embodiments may be cited in function descriptions of corresponding functional modules. Details are not described herein again.

In another form of this embodiment, a computer-readable storage medium is provided. The computer-readable storage medium stores instructions. When the instructions are executed, the method on the terminal side in the foregoing method embodiment is performed.

In another form of this embodiment, a computer program product including instructions is provided. When the instructions are executed, the method on the terminal side in the foregoing method embodiment is performed.

It should be understood that the processor mentioned in embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of the present invention may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA or another programmable logic device, a discrete gate or a transistor logic device, or a discrete hardware assembly, the memory (storage module) is integrated in the processor.

It should be noted that the memory described in this specification is intended to include, but is not limited to, these memories and any other appropriate types of memories.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for a purpose of convenient and brief descriptions, for a detailed working process of the foregoing system, apparatus, and unit, refer to a corresponding process in the foregoing method embodiment. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobility measurement method, comprising:

receiving a configuration message, wherein the configuration message is used to configure a measurement object (MO), and the MO comprises one or more channel state information reference signal (CSI-RS) resources; and determining a scaling factor of the MO depending on whether there is at least one CSI-RS resource of the one or more CSI-RS resources in the MO that completely coincides with a measurement gap, to perform mobility measurement on the MO, wherein determining the scaling factor comprises determining a carrier-specific scaling factor within the measurement gap (CSSFwithingap) based on a CSI-RS periodicity of the MO and a longest periodicity of CSI-RS resources that completely coincide with the measurement gap.

2. The mobility measurement method according to claim 1, wherein the MO is a first MO, and the determining the scaling factor of the first MO depending on whether there is at least one CSI-RS resource of the one or more CSI-RS resources in the first MO that completely coincides with the measurement gap comprises:

in response to determining that there is at least one CSI-RS resource of the one or more CSI-RS resources in the first MO that completely coincides with the measurement gap, determining a CSSFwithingap of the first MO based on the first MO and at least one contention MO different from the first MO that needs to contend for the measurement gap, and determining the CSSFwithingap as the scaling factor of the first MO; or in response to determining that there is no CSI-RS resource of the one or more CSI-RS resources in the first MO that completely coincides with the measurement gap, determining a carrier-specific scaling factor outside the measurement gap (CSSFoutsidegap) of the first MO based on the first MO and an outside MO different from the first MO measured outside the measurement gap, and determining the scaling factor of the first MO based on the CSSFoutsidegap.

3. The mobility measurement method according to claim 2, wherein the contention MO that needs to contend for the measurement gap comprises one or more of a second MO or a third MO;

there is at least one CSI-RS resource in the second MO that completely coincides with the measurement gap; and the third MO comprises a synchronization signal block (SSB) resource that coincides with the measurement gap, wherein the SSB resource is at least one of an SSB for mobility measurement configured by a network device, or an associated SSB (associatedSSB) carried in the first MO.

4. The mobility measurement method according to claim 3, wherein the configuration message is further used to configure the third MO; or the first MO carries an associatedSSB identifier, and the associatedSSB identifier indicates to perform mobility measurement on the third MO.

5. The mobility measurement method according to claim 3, wherein the configuration message is a first configuration message, and the method further comprises:

receiving a second configuration message, wherein the second configuration message is used to configure the third MO.

6. The mobility measurement method according to claim 2, wherein the outside MO measured outside the measurement gap comprises at least one of a second MO or a third MO;

there is no CSI-RS resource in the second MO that completely coincides with the measurement gap; and there is no synchronization signal block (SSB) resource in the third MO that completely coincides with the measurement gap.

7. The mobility measurement method according to claim 6, wherein the configuration message is further used to configure the third MO; or the first MO carries an (associatedSSB) identifier, and the associatedSSB identifier indicates to perform mobility measurement on the third MO.

8. The mobility measurement method according to claim 6, wherein the configuration message is a first configuration message, and the method further comprises:

receiving a second configuration message, wherein the second configuration message is used to configure the third MO.

9. The mobility measurement method according to claim 1, wherein the CSI-RS periodicity of the MO is the longest periodicity of the one or more CSI-RS resources in the MO, or the CSI-RS periodicity of the MO is the longest periodicity of the at least one CSI-RS resource of the one or more CSI-RS resources in the MO that completely coincides with the measurement gap.

10. A communication device, comprising:

one or more processors; and one or more memories coupled to the one or more processors, wherein the one or more memories store computer instructions that, when executed by the one or more processors, cause the communication device to perform the mobility measurement method according to claim 1.

11. A system, comprising:

a processing circuit; and an interface, wherein the processing circuit is configured to invoke a computer program stored in a storage medium, and run the computer program stored in the storage medium, to perform the mobility measurement method according to claim 1.

12. A non-transitory computer-readable storage medium having instructions stored thereon that, when executed by a processor, cause an apparatus to perform the mobility measurement method according to claim 1.

13. A mobility measurement method, comprising:

receiving a configuration message, wherein the configuration message is used to configure a first measurement object (MO), and the first MO comprises one or more channel state information reference signal (CSI-RS) resources; and determining a carrier-specific scaling factor outside a measurement gap (CSSFoutsidegap) of the first MO based on the first MO and an outside MO measured outside the measurement gap, and determining a scaling factor of the first MO based on the CSSFoutsidegap, to perform mobility measurement on the first MO, wherein determining the CSSFoutsidegap is based on a CSI-RS periodicity of the first MO and a longest periodicity of CSI-RS resources in the first MO.

14. The mobility measurement method according to claim 13, wherein the outside MO measured outside the measurement gap comprises one or more of a second MO or a third MO;

there is no CSI-RS resource in the second MO that completely coincides with the measurement gap; and there is no synchronization signal block (SSB) resource that is in the third MO and that completely coincides with the measurement gap, wherein the SSB resource is at least one of an SSB for mobility measurement configured by a network device, or an associated SSB (associatedSSB) carried in the first MO.

15. The mobility measurement method according to claim 14, wherein the configuration message is further used to configure the third MO; or the first MO carries an associatedSSB identifier, and the associatedSSB identifier indicates to perform mobility measurement on the third MO.

16. The mobility measurement method according to claim 14, wherein the configuration message is a first configuration message, and the method further comprises:

receiving a second configuration message, wherein the second configuration message is used to configure the third MO.

17. The mobility measurement method according to claim 13, wherein the CSI-RS periodicity of the first MO is the longest periodicity of the one or more CSI-RS resources in the first MO.

* * * * *